United States Patent
Willms et al.

[11] Patent Number: 6,165,438
[45] Date of Patent: Dec. 26, 2000

[54] APPARATUS AND METHOD FOR SIMULTANEOUS RECOVERY OF HYDROGEN FROM WATER AND FROM HYDROCARBONS

[75] Inventors: R. Scott Willms; Stephen A. Birdsell, both of Los Alamos, N. Mex.

[73] Assignee: The Regents of the University of California, Los Alamos, N. Mex.

[21] Appl. No.: 09/227,220

[22] Filed: Jan. 6, 1999

Related U.S. Application Data

[60] Provisional application No. 60/070,612, Jan. 6, 1998.
[51] Int. Cl.⁷ .............................. C01B 3/26; B01D 53/46
[52] U.S. Cl. .............................. 423/652; 95/56; 422/177; 423/653
[58] Field of Search .............................. 422/177; 95/55, 95/56; 423/648.1, 650, 651, 652, 653

[56] References Cited

U.S. PATENT DOCUMENTS

| | | | |
|---|---|---|---|
| 2,773,561 | 12/1956 | Hunter et al. | 183/115 |
| 2,958,391 | 11/1960 | DeRosset | 183/2 |
| 3,278,268 | 10/1966 | Pfefferle, Jr. | 423/654 |
| 3,439,474 | 4/1969 | McKinley et al. | 55/16 |
| 3,450,500 | 6/1969 | Setzer et al. | 23/212 |
| 4,810,485 | 3/1989 | Marianowski et al. | 423/648.1 |
| 4,981,676 | 1/1991 | Minet et al. | 423/652 |
| 5,229,102 | 7/1993 | Minet et al. | 423/652 |
| 5,525,322 | 6/1996 | Willms | 423/653 |

*Primary Examiner*—Wayne Langel
*Attorney, Agent, or Firm*—Samuel M. Freund

[57] ABSTRACT

Apparatus and method for simultaneous recovery of hydrogen from water and from hydrocarbon feed material. The feed material is caused to flow over a heated catalyst which fosters the water-gas shift reaction ($H_2O + CO \Leftrightarrow H_2 + CO_2$) and the methane steam reforming reaction ($CH_4 + H_2O \Leftrightarrow 3 H_2 + CO$). Both of these reactions proceed only to partial completion. However, by use of a Pd/Ag membrane which is exclusively permeable to hydrogen isotopes in the vicinity of the above reactions and by maintaining a vacuum on the permeate side of the membrane, product hydrogen isotopes are removed and the reactions are caused to proceed further toward completion. A two-stage palladium membrane reactor was tested with a feed composition of 28% $CQ_4$, 35% $Q_2O$ (where Q=H, D, or T), and 31% Ar in 31 hours of continuous operation during which 4.5 g of tritium were processed. Decontamination factors were found to increase with decreasing inlet rate. The first stage was observed to have a decontamination factor of approximately 200, while the second stage had a decontamination factor of $2.9 \times 10^6$. The overall decontamination factor was $5.8 \times 10^8$. When a $Pt/\alpha$-$Al_2O_3$ catalyst is employed, decoking could be performed without catalyst degradation. However, by adjusting the carbon to oxygen ratio of the feed material with the addition of oxygen, coking could be altogether avoided.

11 Claims, 9 Drawing Sheets

APPARATUS AND METHOD FOR
SIMULTANEOUS RECOVERY OF
HYDROGEN FROM WATER AND FROM
HYDROCARBONS

This patent application claims priority from Provisional Patent Application Ser. No. 60/070,612 filed on Jan. 6, 1998.

This invention was made with government support under Contract No. W-7405-ENG-36 awarded by the U.S. Department of Energy to The Regents of the University of California. The government has certain rights in the invention.

FIELD OF THE INVENTION

The present invention relates generally to the simultaneous recovery of hydrogen and hydrogen isotopes from water and hydrocarbons and, more particularly, to the use of Pt catalyst and palladium membranes in staged, heated reactors for driving the water-gas shift reaction and the steam reforming reactions involved, respectively, to near completion.

BACKGROUND OF THE INVENTION

Various technologies are under consideration for recovering tritium from water and hydrocarbons since tritium will need to be recovered from these impurities for environmental and economic reasons.

One such technology includes a palladium membrane reactor (PMR). The PMR is a combined hydrogen permeator and catalytic reactor. Shift catalysts are used to foster reactions such as water-gas shift, $H_2O+CO \rightarrow H_2+CO_2$, and methane steam reforming, $CH_4+H_2O \rightarrow 3H_2+CO$. Due to thermodynamic limitations these reactions only proceed to partial completion. Thus, a Pd/Ag membrane which is exclusively permeable to hydrogen isotopes is incorporated into the reactor. By maintaining a vacuum on the permeate side of the membrane, product hydrogen isotopes, are removed, enabling the reactions to proceed more fully toward completion.

In "Method For Simultaneous Recovery Of Hydrogen From Water And From Hydrocarbons," U.S. Pat. No. 5,525,322, which issued to R. Scott Willms on Jun. 11, 1996, a palladium membrane utilized in cooperation with a nickel catalyst at about 500° C. has been found to simultaneously drive the water gas shift, steam reforming and methane cracking reactions to substantial completion by removing the product hydrogen from mixtures of water and hydrocarbons. In addition, ultrapure hydrogen is collected, thereby eliminating the need for additional product processing. Experiments were conducted at simulated DT fusion reactor exhaust conditions. Decontamination factors (DF=inlet tritium/outlet tritium) were found to be in the 150–400 range. A Ni/γ-Al$_2$O$_3$ catalyst was employed but was found to be unstable under certain conditions in the PMR environment. Pellets tended to break up ink) fine particles, especially when coking occurred. Moreover, for significant flows of exhaust gases, a single-stage reactor would require large permeator areas and pumping capacities to enable the reactions to proceed to levels sufficiently low for environmental release of the retentate stream.

Accordingly, it is an object of the present invention to simultaneously recover hydrogen from water and from hydrocarbons without requiring large pumping capacity.

It is another object of the invention to identify a stable catalyst for simultaneously recovering hydrogen from water and from hydrocarbons.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the apparatus for recovering hydrogen from gaseous hydrocarbon and water feed material of this invention may include: a first gas-tight chamber having an inlet for said gaseous feed material and an outlet for reacted gases; a first hollow Pd/Ag tube suitable for permitting hydrogen to permeate therethrough having an open end and a closed end, the first hollow Pd/Ag tube being disposed within the first chamber with the closed end thereof within the first chamber; a first catalyst disposed within the first chamber and around the first Pd/Ag tube suitable for inducing the reactions $CO+H_2O \Leftrightarrow CO_2+H_2$ and $CH_4+H_2O \Leftrightarrow CO+3H_2$; means for flowing the feed material through the first catalyst; means for extracting hydrogen from the inside of the first Pd/Ag tube through the open end thereof; means for heating the first gas chamber to a chosen temperature such that the reactions proceed therein at a desired rate; a second hollow Pd/Ag tube having two open ends and suitable for permitting hydrogen to permeate therethrough for receiving the reacted gases exiting the outlet of the first chamber through the first open end thereof; a second catalyst disposed within the second hollow Pd/Ag tube suitable for inducing the reactions $CO+H_2O \Leftrightarrow CO_2+H_2$ and $CH_4+H_2O \Leftrightarrow CO+3H_2$; a second gas-tight chamber having an outlet for extracting hydrogen therefrom adapted to receive the second hollow Pd/Ag tube, the open ends of the second hollow Pd/Ag tube being located outside of the second gas-tight chamber; means for extracting hydrogen from the inside of the second chamber through the outlet thereof; and means for heating the second chamber to a chosen temperature such that the reactions proceed within said second hollow Pd/Ag tube at a desired rate.

Preferably, the first catalyst and the second catalysts include Pt/α-Al$_2$O$_3$.

It is also preferred that means are provided for collecting hydrogen extracted from the interior of the first Pd/Ag tube, and for collecting hydrogen extracted from the interior of the second chamber.

In another aspect of the present invention in accordance with its objects and purposes as embodied and broadly described herein, the method for recovering hydrogen from gaseous hydrocarbon and water feed material comprises the steps of: mixing carbon monoxide and water with the feed material, forming thereby a gas mixture such that the reactions $CO+H_2O \Leftrightarrow CO_2+H_2$ and $CH_4+H_2O \Leftrightarrow CO+3H_2$ can occur; flowing the gas mixture through a first heated catalyst such that the equilibrium of the reactions permits substantial generation of hydrogen; contacting the resulting gas mixture with a first heated Pd/Ag membrane, thereby removing the generated hydrogen; removing the hydrogen which has permeated the Pd/Ag membrane; flowing the resulting hydrogen-depleted gas mixture through a second heated catalyst such that the equilibrium of the reactions permits substantial generation of hydrogen; contacting the resulting gas mixture with a second heated Pd/Ag membrane, thereby removing the generated hydrogen; and removing the hydrogen which has permeated the Pd/Ag membrane.

BRIEF DESCRIPTION OF THE DRAWINGS

The accompanying drawings, which are incorporated in and form a part of the specification, illustrate an embodiment of the present invention and, together with the description, serve to explain the principles of the invention. In the drawings.

DETAILED DESCRIPTION

Briefly, the present invention includes a two-stage apparatus and method for simultaneously removing hydrogen from water and from hydrocarbon feed material. The feed material is caused to flow over a heated catalyst which fosters the water-gas shift reaction ($H_2O+CO \Leftrightarrow H_2+CO_2$) and the methane steam reforming reaction ($CH_4+H_2O \Leftrightarrow 3H_2+CO$). Both of these reactions proceed only to partial completion. However, by use of a Pd/Ag membrane which is exclusively permeable to hydrogen isotopes in the vicinity of the above reactions, and by maintaining a vacuum on the permeate side of the membrane, product hydrogen isotopes are removed and the reactions are caused to proceed further toward completion. A single-stage reactor has been found to produce a decontamination factor of 150–400, while the two-stage reactor described in detail hereinbelow using a Pt/α-$Al_2O_3$ catalyst produced a combined decontamination factor of $5.8 \times 10^8$.

Figure 1A:
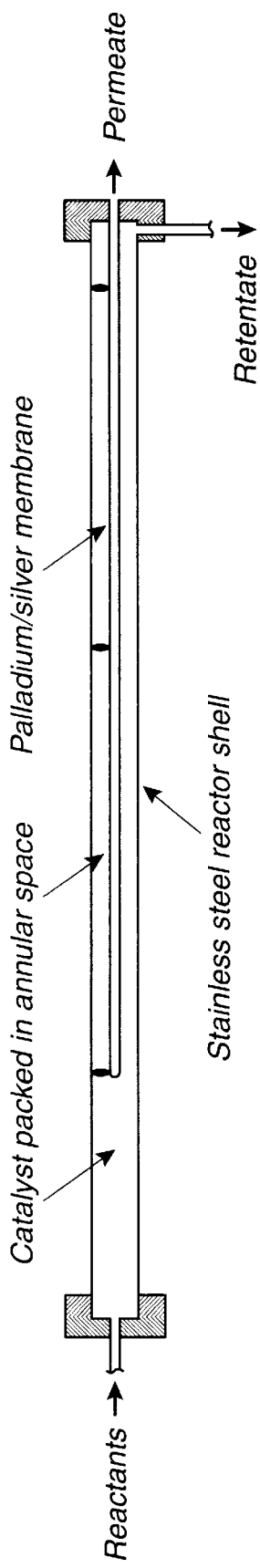
FIGS. 1a and 1b are schematic representations of side views of the first stage and the second stage of the apparatus of the present invention, respectively, where the reacted gases (retentate) exiting the chamber of the first stage are introduced into the permeation tube of the second stage, showing, in particular, that the catalyst material is located within the chamber of the first stage, but within the permeation tube of the second stage.

Reference will now be made in detail to the present preferred embodiments of the invention, examples of which are illustrated in the accompanying drawings. Identical callouts are used to depict similar or identical structure. FIG. 1a is a schematic representation of the first stage of the PMR of the present invention. One PMR tested had a Pd/Ag tube which was 61.0 cm long, 0.635 cm in diameter, with a wall thickness of 0.0178 cm. This tube was closed at one end. The stainless steel chamber of the reactor was 66.0 cm long, 2.54 cm in diameter, with a wall thickness of 0.165 cm. The annular space around the Pd/Ag tube was filled with 297 g of catalyst, and the performance was tested with an inlet mixture of 40 sccm $CH_4$, 50 sccm $H_2O$, and 44 sccm Ar. Reactor temperature was held at a chosen value between 450° C. and 600° C. and the operating pressure was 590 torr, while the permeate pressure was maintained at 0.2 torr by means of a vacuum pump attached to the open end of the Pd/Ag tube. This PMR stage was oriented vertically in a tube furnace with the gas inlet at the top. Three types of catalysts were tested: Ni/γ-$Al_2O_3$ catalyst (United Catalyst C150-8-01), Ni/α-$Al_2O_3$ catalyst (United Catalyst C11-9-09 EW), and Pt/α-$Al_2O_3$ catalyst (Engelhard A-16825).

Figure 1B:
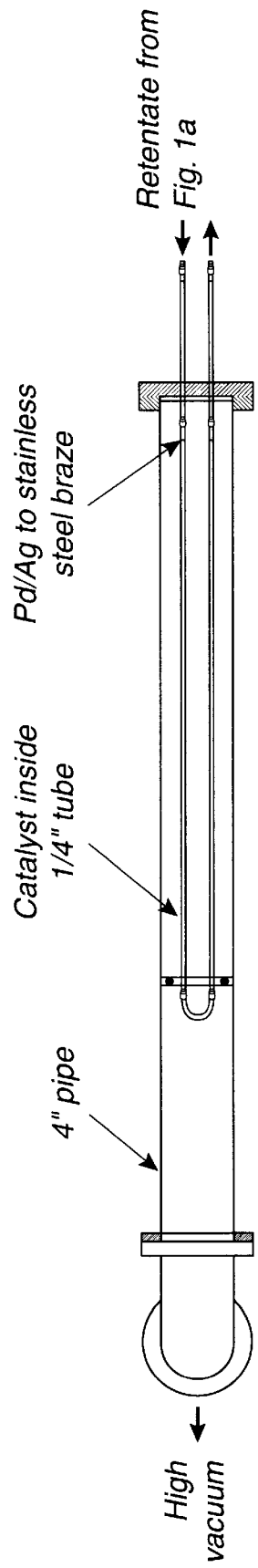

The second stage of the present apparatus is shown schematically in FIG. 1b. The retentate (reacted gases) emerging from the chamber of the first stage was directed into the permeation tube of the second stage through one end thereof, the other end of the permeation tube being vented at atmospheric pressure for situations where tritium is not involved, but directed into a gas scrubber when tritium is present. The permeate was collected from the chamber of the second stage reactor. A 0.64 cm diameter, 163 cm long Pd/Ag tube having both ends open was filled with 10.3 g of Pt/α-$Al_2O_3$ catalyst. The 119 cm long chamber of the second stage was constructed having a large 9.83 cm inner diameter so that a vacuum of about $10^{-6}$ torr could be generated along the length of the permeation tube. This stage was oriented horizontally in a tube furnace which was held at a chosen temperature between 450° C. and 600° C.

Both Ni catalysts exhibited significant pellet degradation after several days of operation. The catalyst was removed and areas of pellet degradation were correlated with areas predicted by a numerical model to have coke deposition. Pellet degradation was accompanied by increasing DF and increasing pressure drop across the catalyst bed. These observations are consistent with the catalyst being converted from relatively large pellets to small particles. Increasing catalyst surface area results in larger reaction rates and decreasing bed porosity results in larger pressure drops. Pellet degradation occurs due to coke formation in the pores of the catalyst.

By contrast to the Ni catalysts, the Pt catalyst showed no sign of pellet degradation. After several days of operation the DF began to slowly decline, which is apparently due to coke deposition. The coke appeared to be forming on the catalyst surface and blocking the active sites, rather than forming in pores and causing structural damage as in the Ni catalysts.

The Pt bed was decoked with dilute $O_2$ and the coking/decoking cycle was repeated. No loss of performance was observed after the cycling.

In order to demonstrate that coking can be avoided altogether, 6% $O_2$ was added to the inlet mixture. The PMR continuously operated for 5 days with no observed decrease in performance. This result demonstrates that coke formation can be avoided regardless of the inlet $CH_4$:$H_2O$ ratio by addition of $O_2$. At the end of these experiments the Pt catalyst had been used for 16 days. The catalyst was removed and inspected. No visual difference was observed between the used catalyst and a fresh sample. The catalyst was reloaded into the PMR and has subsequently been used in over 130 days of operation with no decrease in performance.

Figure 2:
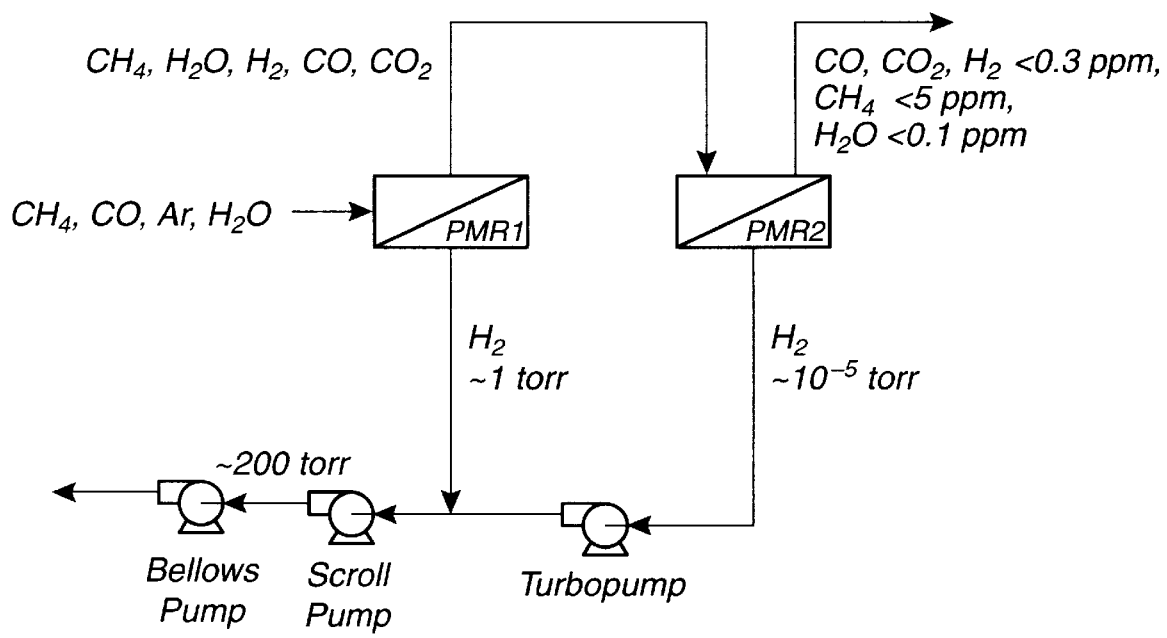
FIG. 2 is a schematic representation of a test apparatus suitable for introducing chosen gas mixtures into the two-stage apparatus of the present invention, for testing the operation thereof, and for independent testing of either the first or second stages thereof.

FIG. 2 is a schematic representation of the two-stage, nontritium, PMR test apparatus used in generating the data set forth hereinbelow. The chosen gas mixture is produced using mass flow controllers. Water vapor is produced by flowing $H_2$ and $O_2$ over a Pt catalyst before injection into the PMR. Carbon monoxide was mixed with the water before injection into the first stage. A combination of a scroll pump and a bellows pump maintained an approximately 0.5 torr vacuum in the permeate side of the first stage for the chosen flow conditions in the chamber thereof. In the second stage, the pumping system was capable of generating an approximately $5 \times 10^{-6}$ torr vacuum. The gas chromatographs employed at the outlet of each stage had a $CH_4$ sensitivity of 5 ppm and a $H_2$ sensitivity of 0.3 ppm. The probes utilized for measuring water concentrations at the outlet of each stage were calibrated from $-80°$ C. to $20°$ C. dew point and had an accuracy of $\pm 1°$ C. dew point.

Having generally described the present invention, the following specific EXAMPLES provide a more detailed description thereof.

EXAMPLE 1

The two-stage system was tested with the ITER mix, with 6.3% of $O_2$ added to the gaseous feed material to prevent coking. The temperatures of the first and second stages were held at 530 and 500° C., respectively. The second stage retentate was vented to the atmosphere which was approximately 590 torr. The pressure drop through the first and second stages was small. At the highest inlet rates, the inlet pressure was 610 torr.

Figure 3:
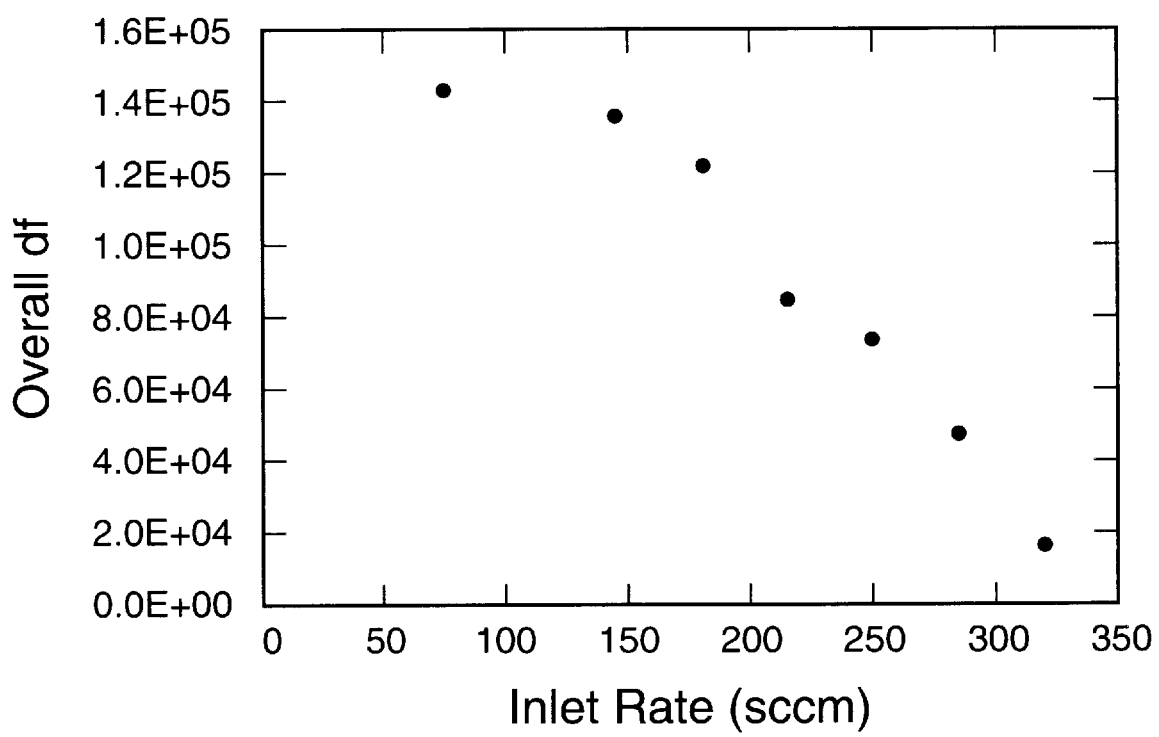
FIG. 3 is a graph of the overall decontamination factor for the present two-stage apparatus as a function of inlet flow rate of a feed composition of 28% $CH_4$, 35% $H_2O$, 31% Ar, and 6.3% $O_2$.

The overall DF as a function of inlet flow rate is shown in FIG. 3 for a feed mixture of 28% $CH_4$, 35% $H_2O$, 31% Ar, and 6.3% $O_2$. The DF approaches an asymptote at $1.4 \times 10^5$. This asymptote represents the maximum sensitivity of the gas chromatograph and humidity probe employed at the outlet of the second stage. Although it was not possible to measure the maximum DF, it is known to occur when the hydrogen in the reaction side of the PMR is in equilibrium with the hydrogen in the permeate side (i.e., at low flow rate).

Figure 4:
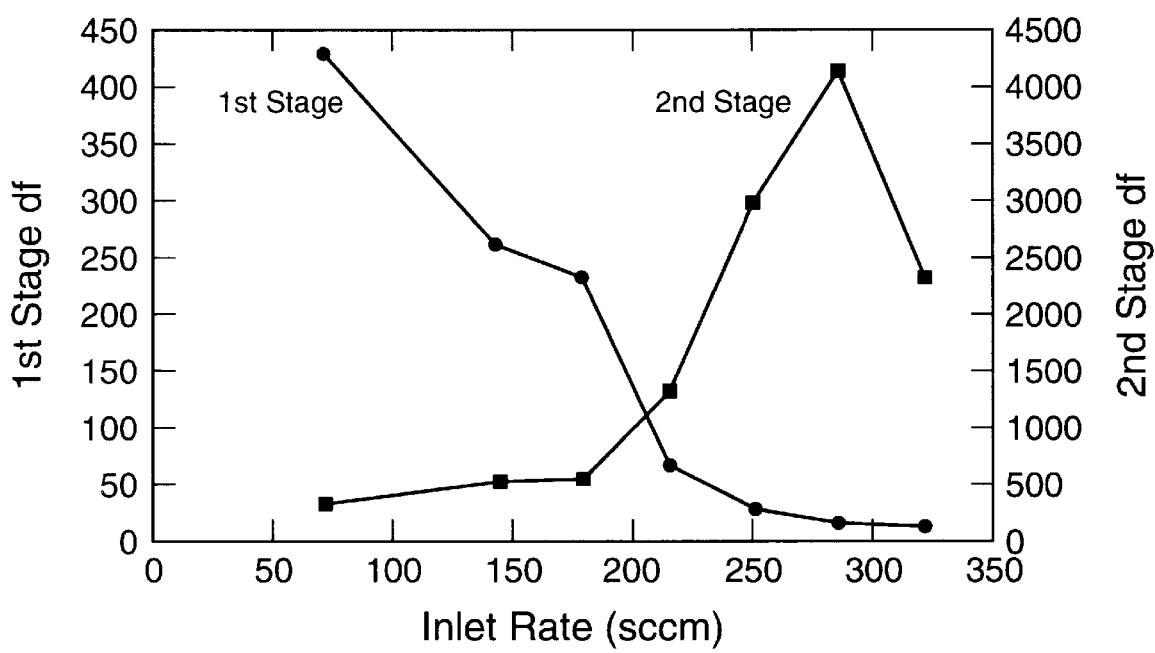
FIG. 4 is a graph of the individual first and second stage decontamination factors as a function of inlet flow rate for the same feed as used for FIG. 3 hereof.

Differentiating the relative contributions of each stage, FIG. 4 shows the DF for the first and second stages at various first stage feed rates for a feed composition of 28% $CH_4$, 35% $H_2O$, 31% Ar, and 6% $O_2$. The first stage makes its greatest contribution to the overall DF at low feed rates. Its DF decreases as the "load" (i.e., flow) is increased. Although not apparent in this Figure, at even lower feed rates the first stage DF would reach a plateau as it becomes limited by the permeate pressure.

The second-stage behavior is more complicated since both the flow rate and composition of its feed were varying. At low first-stage feed rates the second-stage DF is low since the first stage is not leaving much hydrogen for the second stage to process. As rates increase, more hydrogen reaches the second stage and this stage exhibits an increasing DF. At the highest rates, however, the second stage exhibits a rate limitation as its DF starts dropping. The two-stage apparatus was tested with the nontritium mix for 61 days of continuous operation.

EXAMPLE 2

Figure 5:
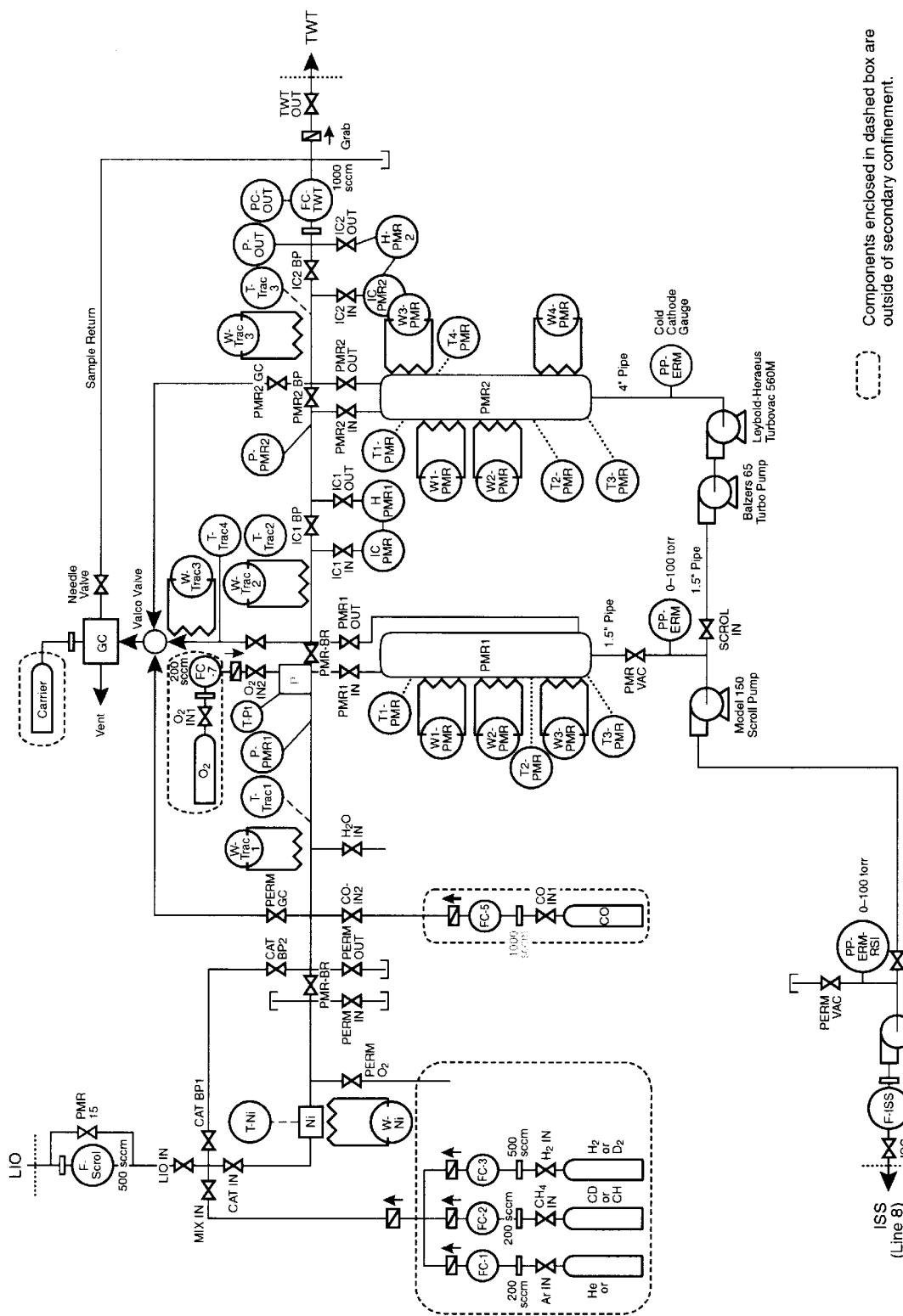
FIG. 5 is a schematic representation of a tritium-compatible test apparatus suitable for introducing gas mixtures into the two-stage apparatus of the present invention and for testing the operation thereof, and for independent testing of either the first or second stages thereof.

In addition to the nontritium test apparatus, a two-stage, tritium-compatible PMR system was constructed inside of a glovebox. FIG. 5 is a schematic representation of this test system. The first PMR stage for these tests had an outer diameter of 10.2 cm with a 0.165 cm wall thickness, and 7223 g of Pt/α-$Al_2O_3$ catalyst was packed around 6 Pd/Ag tubes. One of the Pd/Ag tubes is located on the centerline and the remaining five are arranged in a 5.4 cm circle.

The PMRs employed were similar to those used in the tritium-free experiments, but were scaled up by a factor of 6 in the surface area of Pd/Ag tubing. The gas chromatograph and humidity probes were the same as those used in the tritium-free test apparatus. Two Overhoff Technology ion chambers were installed in the test apparatus. The ion chamber located at the outlet of the first stage had a range of $1 \times 10^{-1}$ to $2 \times 10^6$ Ci/$m^3$, while the chamber located at the outlet to the second stage had a range of $3.4 \times 10^0$ to $2 \times 10^4$ Ci/$m^3$.

The first- and second-stage PMRs were heated to 530 and 500° C., respectively, and a feed mixture of 40 sccm $CH_4$, 50 sccm $H_2$, 44 sccm Ar, and 34 sccm $O_2$ were injected into the test apparatus. When steady-state conditions were achieved, the $H_2$ flow was replaced with a 50 sccm mixture of hydrogen isotopes containing 18% tritium, 75% deuterium, and 7% protium. The $CH_4$, $Q_2$(Q=H, D, or T), and Ar mixture passed through a Ni catalyst bed at 400° C. This process equilibrates the hydrogen isotopes between the $CQ_4$ and $Q_2$ forms. Oxygen was injected into the mixture before it reached the Pt bed. The temperature of the Pt bed was controlled so that essentially all of the $Q_2$, but none of the $CQ_4$, is oxidized. Thus, a mixture of 40 sccm $CQ_4$, 50 sccm $Q_2$, 44 sccm Ar, and 9 sccm $O_2$ was injected into the PMR system. The outlet pressure was held at 900 torr and the corresponding inlet pressure was only slightly higher.

Figure 6:
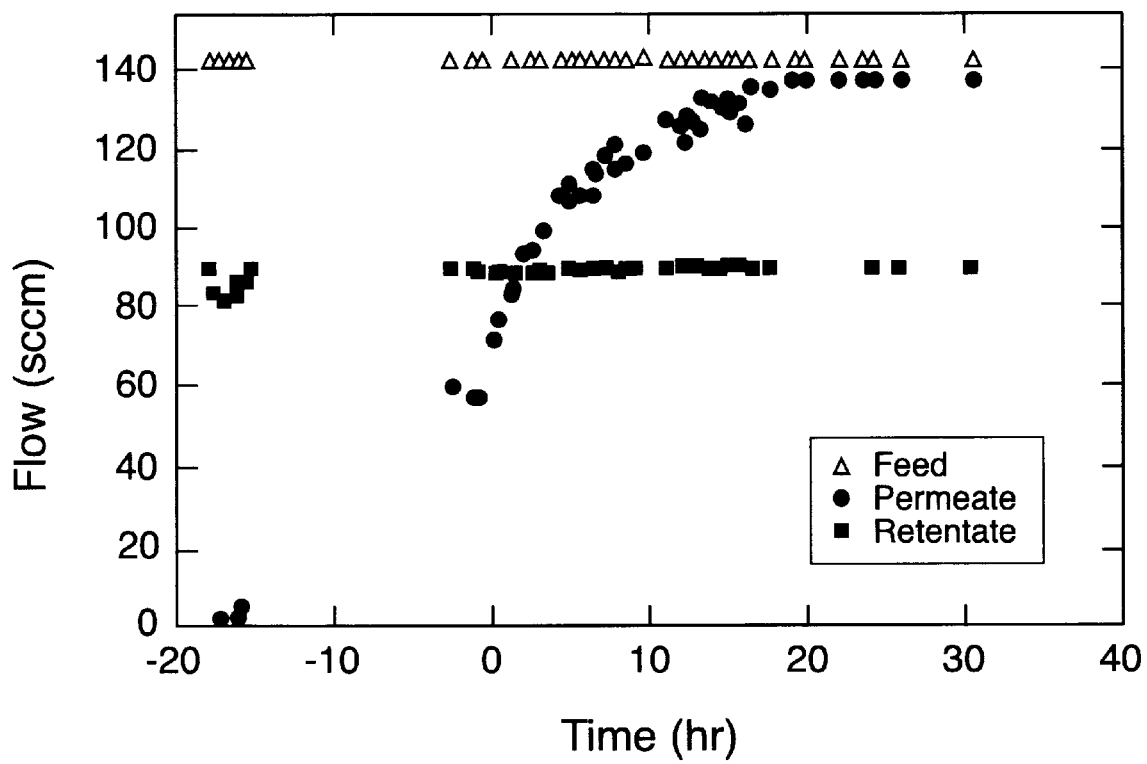
FIG. 6 is a graph of the feed and effluent rates as a function of time for the 31 hour tritium test of the two-stage apparatus.

A 31-hour experiment was run at the conditions described above, with 4.5 g of tritium being processed during the experiment. FIG. 6 is a graph of the feed, permeate and retentate rates for the 31 hr tritium test of the two-stage PMR system. Before time zero, near steady-state conditions had been established with protium as the only hydrogen isotope. As can be seen from the Figure, the permeate flow was not yet stabilized. However, all of the other rates and the effluent concentrations had stabilized. At time zero, the protium flow was replaced with the mixture of hydrogen isotopes.

Figure 7:
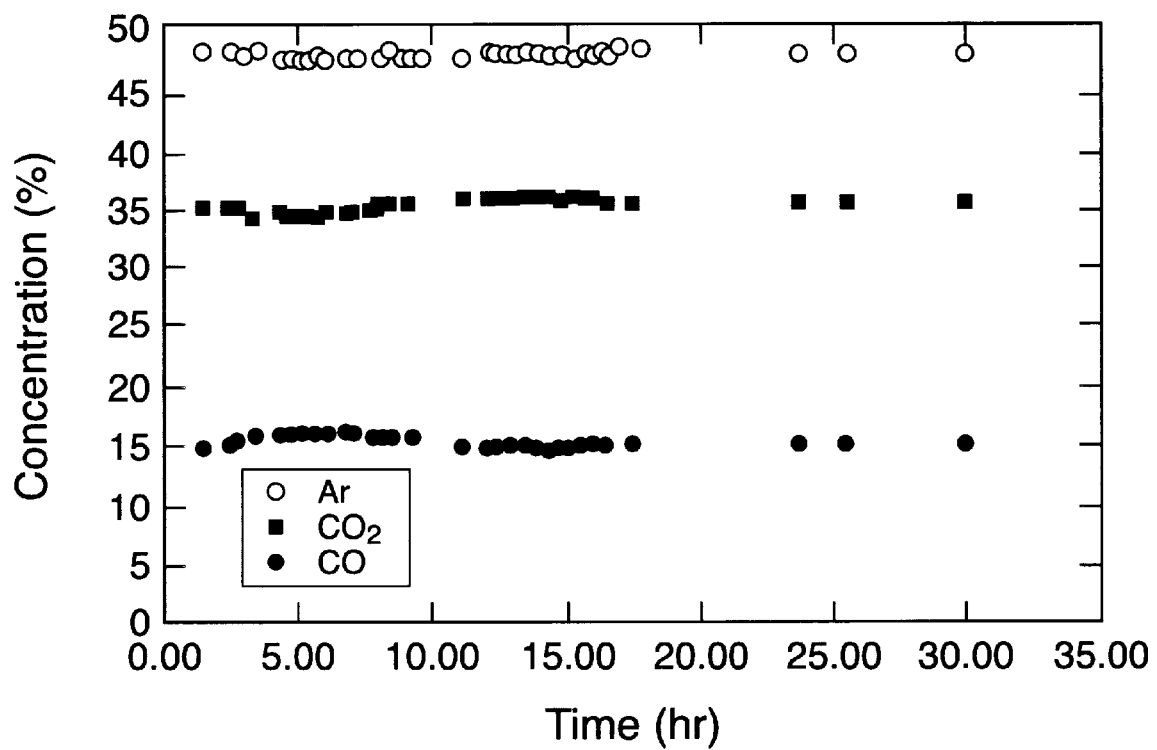
FIG. 7 is a graph of the Ar, CO, and $CO_2$ concentrations in the retentate of the first stage of the present apparatus as a function of time.
Figure 8:
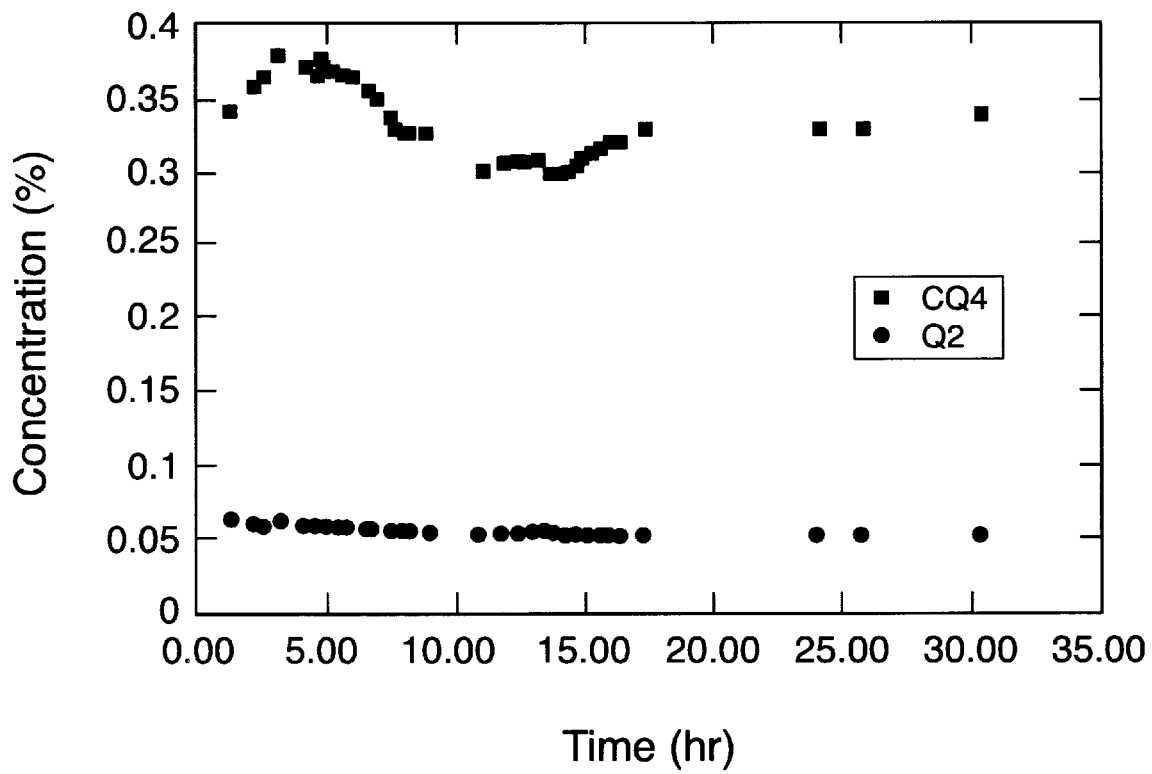
FIG. 8 is a graph of the $CQ_4$ and $Q_2$ concentrations in the retentate of the first stage of the present apparatus as a function of time.
Figure 9:
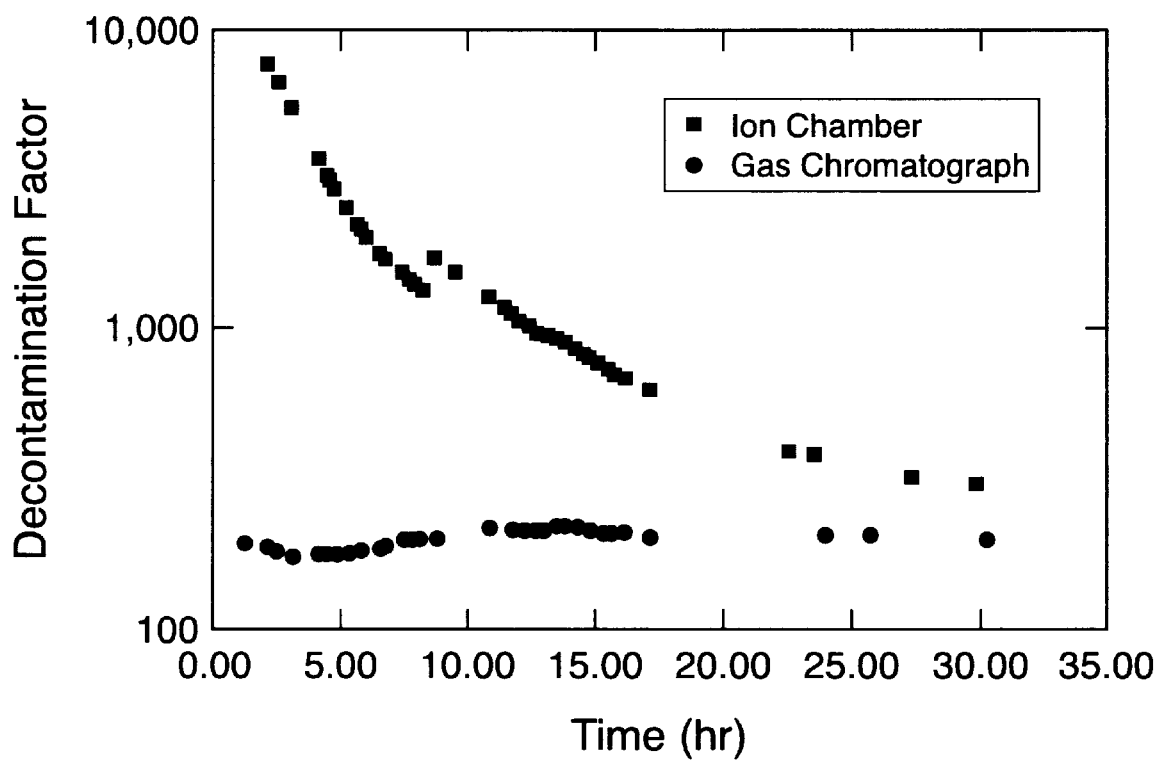
FIG. 9 is a graph of the first-stage decontamination factor calculated by ion chamber and gas chromatographic measurements as a function of time.

FIG. 7 is a graph of the gas chromatographic analysis for Ar, CO, and $CO_2$ in the first-stage retentate. Argon is not measured by the gas chromatograph, but is calculated from continuity. FIG. 8 is a graph of the gas chromatographic analysis for $CQ_4$ and $Q_2$ in the first-stage retentate. The remaining tritium-containing specie in the first stage retentate is $Q_2O$, which was constant throughout the experiment at a much lower 0.0035%. Decontamination factors were determined from the gas chromatograph results and also from the ion chamber results for the first stage (FIG. 9). The ion chamber data shows that tritium began breaking through the first stage shortly after tritium injection began. The DF was 300 at the end of the experiment, but it was slowly decreasing. The DF calculated from gas chromatograph data was almost constant at 200 because the gas chromatograph does not distinguish between hydrogen isotopes.

Determination of the DF for the second-stage retentate stream proved to be much more difficult than that for the first stage. As in the tritium-free experiments, measurement of $CQ_4$ and $Q_2$ by gas chromatograph and $Q_2O$ by humidity probe were not possible because the values were below the range of the instruments. This also proved to be the situation for the ion chamber at the outlet of the second stage. Activity never rose above background for this instrument. Therefore, a bubbler method was used to measure the activity of the outlet stream. All retentate flow was oxidized over a CuO bed and bubbled through 200 ml of glycol. A 1.0 cm$^3$ sample was counted on a scintillation counter about every hour beginning with the twenty-third hour of the experiment. Accumulation of tritium was constant at approximately 2.5 $\mu$Ci/hr from the twenty-third hour through the end of the experiment. This outlet tritium rate divided into the first stage inlet rate of 1440 Ci/hr gives an overall DF of 5.8×10$^8$. The second stage DF is then 1.9×10$^6$ if it is assumed that the first stage DF equals 200 (i.e., gas chromatographic method).

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for recovering hydrogen from gaseous hydrocarbon and water feed material, which comprises in combination:

a. a first gas-tight chamber having an inlet for said gaseous feed material and an outlet for reacted gases;

b. a first hollow Pd/Ag tube suitable for permitting hydrogen to permeate therethrough having a closed end, and an open end, said first hollow Pd/Ag tube being disposed within said first gas-tight chamber with the closed end thereof within said first gas-tight chamber;

c. a first catalyst disposed within said first chamber and around said first Pd/Ag tube suitable for inducing the reactions $CO+H_2O \Leftrightarrow CO_2+H_2$ and $CH_4+H_2O \Leftrightarrow CO+3H_2$;

d. means for flowing the feed material through said first catalyst;

e. means for extracting hydrogen from the inside of said first Pd/Ag tube through the open end thereof;

f. means for heating said first gas-tight chamber to a temperature such that the reactions proceed therein at a desired rate;

g. a second hollow Pd/Ag tube having a first open end and a second open end and suitable for permitting hydrogen to permeate therethrough for receiving the reacted gases exiting the outlet of said first gas-tight chamber through the first open end thereof;

h. a second catalyst disposed within said second hollow Pd/Ag tube suitable for inducing the reactions $CO+H_2O \Leftrightarrow CO_2+H_2$ and $CH_4+H_2 \Leftrightarrow CO+3H_2$;

i. a second gas-tight chamber having an outlet for extracting hydrogen therefrom adapted to receive said second hollow Pd/Ag tube, the first open end and the second open end of said second hollow Pd/Ag tube being located outside of said second gas-tight chamber;

j. means for extracting hydrogen from the inside of said second gas-tight chamber through the outlet thereof; and k. means for heating said second gas-tight chamber to a temperature such that the reactions proceed within said second hollow Pd/Ag tube at a desired rate.

2. The apparatus of claim 1, wherein said first catalyst and said second catalyst include Pt/$\alpha$-Al$_2$O$_3$.

3. The apparatus of claim 1, further comprising means for collecting hydrogen extracted from the interior of said first Pd/Ag tube, and means for collecting hydrogen extracted from the interior of said second gas-tight chamber.

4. The apparatus of claim 1, wherein the second open end of said second Pd/Ag tube is vented to the atmosphere.

5. The apparatus of claim 1, wherein means are provided for mixing CO with said gaseous feed material.

6. A method for recovering hydrogen from gaseous hydrocarbon and water feed material, which comprises the steps of:

a. mixing carbon monoxide and water with the feed material, forming thereby a gas mixture such that the reactions $CO+H_2O \Leftrightarrow CO_2+H_2$ and $CH_4+H_2O \Leftrightarrow CO+3H_2$ can occur;

b. flowing the gas mixture through a first heated catalyst such that the equilibrium of the reactions permits substantial generation of hydrogen;

c. contacting the resulting gas mixture with a first heated Pd/Ag membrane, thereby removing the generated hydrogen;

d. removing the hydrogen which has permeated the Pd/Ag membrane;

e. flowing the resulting hydrogen-depleted gas mixture through a second heated catalyst such that the equilibrium of the reactions permits substantial generation of hydrogen;

f. contacting the resulting gas mixture from step e with a second heated Pd/Ag membrane, thereby removing the generated hydrogen; and g. removing the hydrogen which has permeated the second Pd/Ag membrane.

7. The method of claim 6, wherein the first catalyst and the first Pd/Ag membrane are heated to substantially the same temperature, and the second catalyst and the second Pd/Ag membrane are heated to substantially the same temperature.

8. The method of claim 6, wherein the first catalyst and the first Pd/Ag membrane are in physical contact and the second catalyst and the second Pd/Ag membrane are in physical contact.

9. The method of claim 6, wherein the first catalyst, the second catalyst, the first Pd/Ag membrane and the second Pd/Ag membrane are heated to a temperature between 450° C. and 600° C.

10. The method of claim 6, wherein the amounts of carbon monoxide and water are chosen such that the hydrogen-bearing compounds in the feed material are substantially consumed in the reactions.

11. The method of claim 6, wherein oxygen is mixed with the gaseous feed material in order to avoid carbon formation.

* * * * *